(12) United States Patent
Yoshida et al.

(10) Patent No.: US 7,198,861 B2
(45) Date of Patent: Apr. 3, 2007

(54) MAGNETIC RECORDING MEDIUM AND METHOD OF PRODUCING THE SAME

(75) Inventors: Shinya Yoshida, Miyagi (JP); Hitoshi Wako, Miyagi (JP)

(73) Assignee: Sony Corporation, Tokyo (JP)

( * ) Notice: Subject to any disclaimer, the term of this patent is extended or adjusted under 35 U.S.C. 154(b) by 102 days.

(21) Appl. No.: 10/271,172

(22) Filed: Oct. 15, 2002

(65) Prior Publication Data

US 2003/0087134 A1    May 8, 2003

(30) Foreign Application Priority Data

Oct. 16, 2001 (JP) ............................ P2001-318485

(51) Int. Cl.
*G11B 5/66* (2006.01)
*G11B 5/70* (2006.01)

(52) U.S. Cl. .................................. 428/832.1

(58) Field of Classification Search ............ 428/694 T, 428/694 TM, 336, 332, 900, 611, 668, 832.1
See application file for complete search history.

(56) References Cited

U.S. PATENT DOCUMENTS 4,758,471 A * 7/1988 Arioka et al. ............... 428/336
4,892,789 A * 1/1990 Nakayama et al. .......... 428/336
4,900,622 A * 2/1990 Nakayama et al. .......... 428/336
5,472,506 A * 12/1995 Tohma et al. ............... 118/718
5,942,342 A * 8/1999 Hikosaka et al. ........ 428/832.1
6,652,998 B2 * 11/2003 Segawa et al. .......... 428/832.1
6,746,749 B2 * 6/2004 Kirino et al. ................ 428/116

* cited by examiner

*Primary Examiner*—Holly Rickman
(74) *Attorney, Agent, or Firm*—Sonnenschein Nath & Rosenthal LLP

(57) ABSTRACT

A magnetic recording medium having high C/N ratio characteristics particularly in a short wavelength range and capable of attaining a further higher-density recording as a magnetic recording tape produced by forming a magnetic layer by a vapor deposition method and other magnetic recording media of the next generation and a method of producing the same, wherein a magnetic layer is formed by a vapor deposition method on a nonmagnetic supporting body made of a polymer substrate, which has a configuration of comprising a nonmagnetic supporting body, an under layer formed on the nonmagnetic supporting body, containing Co and O and having an atomic ratio of O/Co of 0.4 or more and a magnetic layer containing Co and O, wherein the film thickness of the under layer is made 50 nm or less and the maximum incident angle is made 70° or less in the vapor deposition method.

13 Claims, 3 Drawing Sheets

MAGNETIC RECORDING MEDIUM AND METHOD OF PRODUCING THE SAME

RELATED APPLICATION DATA

The present invention claims priority to Japanese Application No. P2001-318485 filed Oct. 16, 2001, which application is incorporated herein by reference to the extent permitted by law.

BACKGROUND OF THE INVENTION

1. Field of the Invention

The present invention relates to a magnetic recording medium and a method of producing the same, particularly relates to a magnetic tape medium made by forming a magnetic layer comprised of a metal magnetic thin film on a nonmagnetic supporting body and other metal thin film type magnetic recording media and a method of producing the same.

2. Description of the Related Art

In a magnetic recording field, strong demands have been made on higher-density recording every year along with an increase in the amount of recording information.

In accordance with the above, a magnetic recording medium produced by forming a thin film of ferromagnetic metal by a thin film forming method using plating, vacuum deposition method, sputtering method, ion-plating method and other vacuum thin film forming methods (hereinafter, also referred to as a thin film type medium) has been becoming a main stream instead of those produced by a widely used method of dispersing magnetic crystal grain in a binder to coat (hereinafter, also referred to as a coating type medium).

The thin film type medium having a ferromagnetic metal thin film has excellent coercive force and squareness ratio, etc. and does not require mixing of a binder which is not a magnetic material in its magnetic layer as in the coating type medium, so it is possible to heighten the filling density of a magnetic material (in other words, a magnetization amount per unit volume) and to make a film thickness of the magnetic layer remarkably thin compared with that of the coating type medium. Thus, it has an excellent electromagnetic conversion characteristic in a short wavelength range expected to be broadly used in the future.

Furthermore, the above thin film type medium has a characteristic that its recording degauss is remarkably small.

From the above advantages, the thin film type medium having a ferromagnetic metal thin film will be a main stream in magnetic recording media for high-density recording in the future without doubt.

In a magnetic recording system using a magnetic recording tape, a kind of thin film type media, so-called obliquely evaporated tape has been put into practice so as to improve electromagnetic conversion characteristic and attain a higher output in the short wavelength range.

FIG. 1 is a cross-sectional view of the above obliquely evaporated tape.

A magnetic layer 3 as a ferromagnetic metal thin film is formed on a nonmagnetic supporting body 1, a protective film 4 made of carbon, etc. is formed thereon, a top coat layer 5 made of lubricant, etc. is formed thereon.

On the other hand, a back coat layer 6 is formed on the back surface of the nonmagnetic supporting body 1.

The magnetic recording medium having the above configuration is cut to be a tape shape to form the obliquely evaporated tape.

The nonmagnetic supporting body 1 is comprised of a high polymer film such as a polyester film, polyamide film, polyimide film, etc.

The magnetic layer 3 is a ferromagnetic metal thin film formed by the so-called oblique evaporation method of moving the nonmagnetic supporting body 1 in a predetermined direction and depositing a magnetic metal on the surface of the nonmagnetic supporting body 1 from an oblique direction by a vacuum deposition method.

As the magnetic metal composing the above magnetic layer 3, Co and Ni are widely used.

To form the above magnetic layer 3 on the nonmagnetic supporting body 1 by the vapor deposition method, a method of using, for example, Co and Ni as a vapor deposition source and spraying an oxygen gas to the moving nonmagnetic supporting body is widely used.

When forming a film as the above, the magnetic layer 3 becomes to have a configuration in which magnetic crystal grain of $\alpha$-Co (or Co—Ni) and nonmagnetic CoO (or CoNiO) exist together.

Here, an object of introducing oxygen into the film is to improve magnetic characteristics by introducing nonmagnetic crystal grain and making crystal grain finer and to reduce medium noise by interrupting magnetic bonding between magnetic crystal grain.

In the thus obtained obliquely evaporated tape currently in practical use, an inclination angle of an easy axis of magnetization of the magnetic layer 3 is about 20 to 30°.

Since magnetic crystal grain is oriented obliquely with respect to the surface of the nonmagnetic supporting body in the magnetic tape produced by the above oblique evaporation method, higher-density recording becomes possible compared with magnetic tapes of the related art wherein magnetic crystal grain is oriented in the longitudinal direction of the supporting body of the tape shape.

In the fields of VTR and computer storage, however, a tape having a larger capacity, more compact body and lighter weight by further higher-density recording are desired for the above obliquely evaporated tape.

To realize higher-density recording than that of currently used magnetic recording tapes, a higher output and lower noise of the medium, that is, a higher C/N ratio is essential, particularly, a higher C/N ratio in the short wavelength range is significant.

SUMMARY OF THE INVENTION

An object of the present invention is to provide a magnetic recording medium having high C/N ratio characteristics also in a short wavelength range so as to be able to attain further higher-density recording as a large capacity magnetic recording medium of the next generation, such as a magnetic recording tape produced by forming a magnetic layer by a deposition method, etc. and a method of producing the same.

To attain the above object, according to the present invention, there is provided a magnetic recording medium produced by forming a magnetic layer by a vapor deposition method on a nonmagnetic supporting body made of a polymer substrate, comprising a nonmagnetic supporting body; an under layer formed on the nonmagnetic supporting body, containing Co and O and having an atomic ratio of O/Co of 0.4 or more; and a magnetic layer formed on the under layer and containing Co and O.

Preferably, the under layer has a film thickness of 50 nm or less in the above magnetic recording medium of the present invention.

Preferably, the under layer is a film deposited by a maximum incident angle of an under layer component of 70° or less with respect to the nonmagnetic supporting body in the vapor deposition method in the above magnetic recording medium of the present invention.

In the above magnetic recording medium of the present invention, the under layer containing Co and O and having the atomic ratio of O/Co of 0.4 or more is formed between the nonmagnetic supporting body and the magnetic layer.

By forming the under layer, magnetic characteristics of the medium, particularly coercive force Hc is largely improved. By heightening the Hc, recording magnetization capable of overcoming a demagnetizing field in the medium can be formed and the demagnetization becomes larger in a short wavelength range wherein a length of recording magnetization is short. Therefore, an increase of output and reduction of noise particularly in the short wavelength range can be obtained and further higher-density recording becomes possible.

It is considered that since the Co/CoO magnetic layer is stacked on the nonmagnetic supporting body via the under layer, the magnetic layer can grow under a condition where crystallizing orientation is good from an initial stage of the growth.

Furthermore, to decrease noise of a medium, it is efficient to make crystal grain of the magnetic layer fine and uniform and an improvement of tape surface nature is also significant.

Generally, fine crystal grain called filler is added inside the nonmagnetic supporting body of the evaporated tape or coated as an undercoat thereof so as to make the surface of the nonmagnetic supporting body rough and improve durability of the tape. However, when forming a film on the nonmagnetic supporting body having a rough surface as such with a maximum incident angle of 90° at the time of deposition, a surface shape of the magnetic layer reflects the surface nature of the nonmagnetic supporting body due to a shadowing effect of deposition crystal grain. Namely, since deposition crystal grain easily adhere to the places where the filler exists while hard to adhere to the places in the shadow of the filler, on the surface of the magnetic layer, places where the filler exists become convex while the shadow thereof becomes concave. The noise of the medium largely affects the surface nature of the medium, so poorness of the surface nature leads to an increase of the noise.

Furthermore, due to the shadowing effect, at the initial stage of growth of the magnetic layer, sizes of grain vary much and holes and other disadvantages easily arise, becoming the noise source of the medium at the time of recording and reproducing.

By adopting the configuration in which an under layer is formed between the nonmagnetic supporting body and the magnetic layer, and furthermore, by forming on the nonmagnetic supporting body a film of the under layer with a maximum incident angle of 70° or less at the time of deposition, the above shadowing effect is suppressed and a magnetic layer having a smoother surface and homogeneous configuration from an initial stage of its growth can be produced in the above magnetic recording medium of the present invention.

As explained above, according to the magnetic recording medium of the present invention, particularly high C/N ratio characteristics can be attained even in a short wavelength range and further higher-density recording becomes possible in a magnetic recording medium produced by forming a magnetic layer by a vapor deposition method.

Also, to attain the above object, there is provided a method of producing a magnetic recording medium produced by forming a magnetic layer by a vapor deposition method on a nonmagnetic supporting body made of a polymer substrate, comprising the steps of forming on a nonmagnetic supporting body an under layer containing Co and O and having an atomic ratio of O/Co of 0.4 or more; and forming a magnetic layer containing Co and O on the under layer.

Preferably, an under layer having a film thickness of 50 nm or less is formed in the step of forming the under layer.

Preferably, the under layer component is deposited with the maximum incident angle of 70° or less with respect to the nonmagnetic supporting body by the vapor deposition method for forming in the step of forming the under layer.

In the above production method of the magnetic recording medium of the present invention, the under layer containing Co and O and having an atomic ratio of O/Co of 0.4 or more is formed on the nonmagnetic supporting body and the magnetic layer containing Co and O is formed on the under layer in the method of producing the magnetic recording medium produced by forming a magnetic layer by a vapor deposition on a nonmagnetic supporting body.

According to the above production method of the magnetic recording medium of the present invention, since the under layer containing Co and O and having an atomic ratio of O/Co of 0.4 or more is formed between the nonmagnetic supporting body and the magnetic layer, magnetic characteristics of the medium, particularly a coercive force Hc can be largely improved.

Also, particularly by forming on the nonmagnetic supporting body a film of the under layer with a maximum incident angle of 70° or less at the time of depositing, the above shadowing effect can be suppressed and a magnetic layer having a smooth surface and homogeneous configuration from an initial stage of its growth can be produced.

Therefore, according to the production method of a magnetic recording medium of the present invention, particularly high C/N ratio characteristics can be attained even in a short wavelength range and further higher-density recording becomes possible in the magnetic recording medium produced by forming a magnetic layer by the vapor deposition method.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Below, a magnetic recording medium and a method of producing the same according to the present embodiment will be explained.

Figure 1:
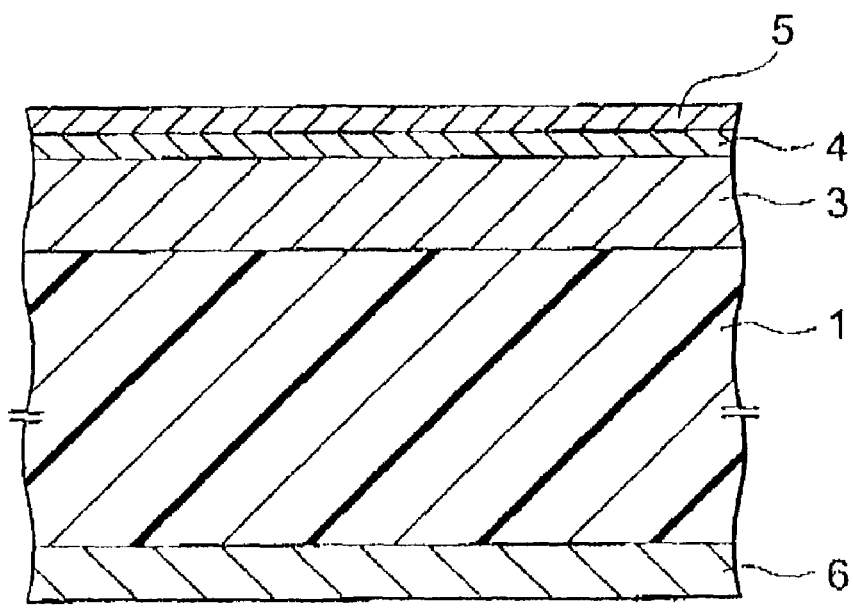
FIG. 1 is a cross-sectional view of an obliquely evaporated tape according to the related art.
Figure 2:
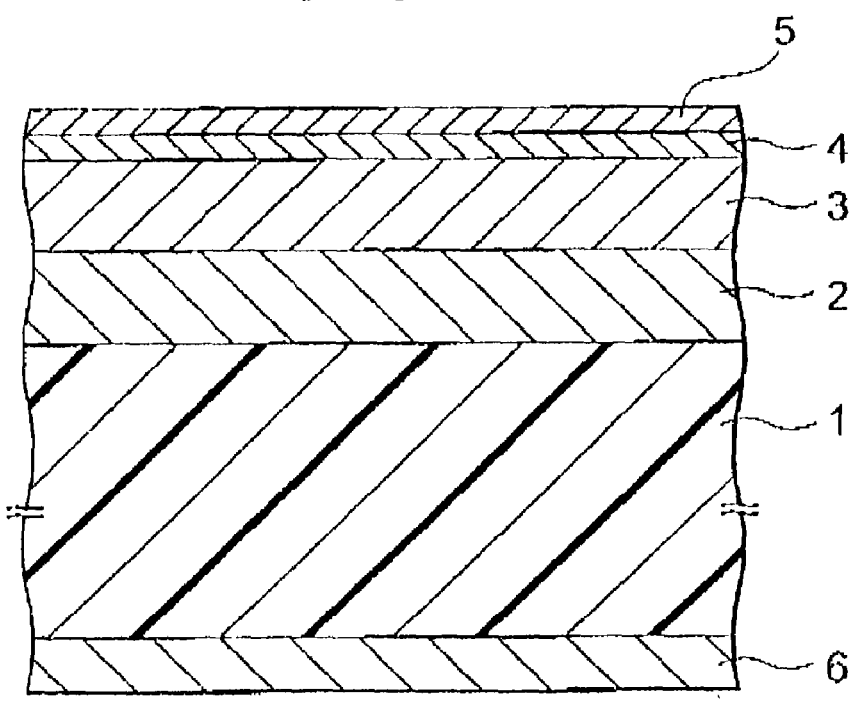
FIG. 2 is a cross-sectional view of an obliquely evaporated tape as a magnetic recording medium according to an embodiment of the present invention.

FIG. 2 is a cross-sectional view of an obliquely evaporated tape as a magnetic recording medium according to the present embodiment.

An under layer 2 is formed on a nonmagnetic supporting body 1, a magnetic layer 3 as a ferromagnetic metal thin film is formed thereon, a protective film 4 made of carbon, etc. is formed thereon, and a topcoat layer 5 made of lubricant, etc. is formed thereon.

On the other hand, a back coat layer 6 is formed on the back surface of the nonmagnetic supporting body 1.

The magnetic recording medium having the above configuration is cut to be a tape shape to form the obliquely evaporated tape.

As the nonmagnetic supporting body 1, a polymer supporting body, etc. formed by polymer materials, represented by polyesters such as polyethylene terephthalate, polyethylene-2, 6-naphthalate, polyolefins such as polypropylene, and cellulose derivatives such as cellulose triacetate and cellulose diacetate, vinyl-base resin, polyimides, polyamides, polycarbonate, etc. can be mentioned. Also, Cu, Al, Zn and other metals and glass, boron nitride, Si carbide and other ceramics can be used.

Fine crystal grain called filler is added inside the above nonmagnetic supporting body 1 or coated as an undercoat thereof so as to make the surface of the nonmagnetic supporting body rough and improve durability of the tape.

The under layer 2 is a film containing Co and O and having an atomic ratio of O/Co of 0.4 or more. The film thickness is about 10 to 100 nm, preferably equal to or less than 50 nm.

For example, the nonmagnetic supporting body 1 can be formed by the so-called oblique evaporation method, wherein the nonmagnetic supporting body 1 is moved in a predetermined direction and an under layer component is deposited on its surface from an oblique direction by a vacuum deposition method. At this time, it is preferable that the maximum incident angle with respect to the nonmagnetic supporting body 1 is 70° or less for depositing to form.

The magnetic layer 3 is a film containing Co and O, having an atomic ratio of O/Co of, for example, about 0.2 to 0.4 and a film thickness of, for example, about 30 to 200 nm.

The magnetic layer 3 can be formed by the oblique evaporation method in the same way as the under layer 2.

In the obliquely evaporated tape obtained as the above, an inclination angle of an easy axis of magnetization of the magnetic layer 3 is about 20 to 30°.

As the protective film 4, carbon, $Al_2O_3$, Ti—N, Mo—C, Cr—C, SiO, $SiO_2$, SiN, etc. can be mentioned, but it is not limited to those and any of conventionally well known materials can be used.

The top coat layer 5 is comprised of an antirust or lubricant and any of those normally used as its material for magnetic recording media of this kind can be used.

Also, on a surface of an opposite side of the magnetic layer of the nonmagnetic supporting body, a back coat layer 6 comprised of nonmagnetic powder (for example, silica and carbon black) and a binder can be provided for improving cursoriality of the medium.

As a recording/reproducing system of the magnetic recording medium according to the above present embodiment, not to mention a conventional system using an inductive head, a system of the next generation using an MR head or GMR head as a reproduction head can be applied.

The magnetic recording medium according to the above present embodiment is capable of largely improving magnetic characteristics, particularly a coercive force, of the magnetic layer, attaining high C/N ratio characteristics particularly even in a short wavelength range and realizing further higher-density recording by being provided with an under layer containing Co and O made of a film formed with a maximum incident angle of 70° or less between the nonmagnetic supporting body and the magnetic layer in the obliquely evaporated tape.

Next, a method of producing the magnetic recording medium according to the above present embodiment will be explained.

Figure 3A:
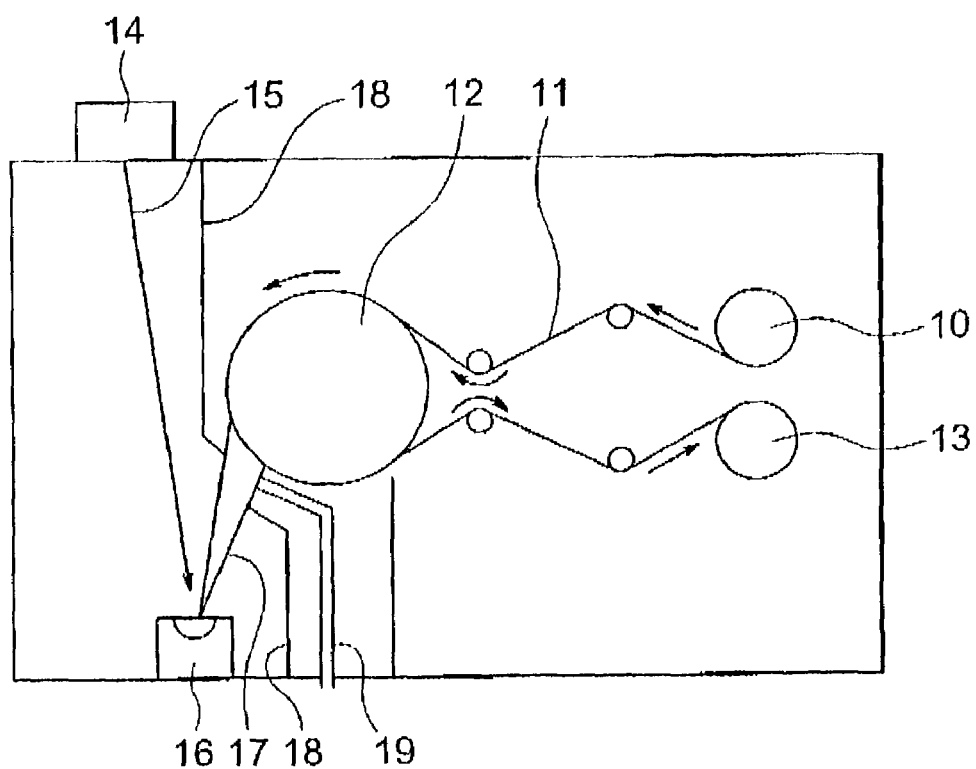
FIG. 3A is a schematic view of an overall oblique evaporation apparatus used for forming a film of an under layer and a magnetic layer in a production method of a magnetic recording medium according to an embodiment of the present invention and FIG. 3B is a schematic view of a key portion.
Figure 3B:
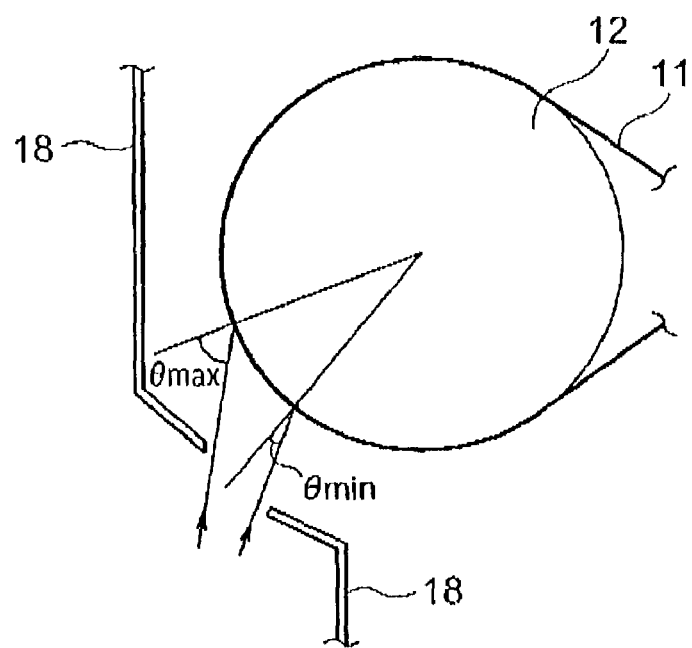

FIG. 3A is a schematic view of an overall oblique evaporation apparatus used for forming a film of an under layer and a magnetic layer in a production method of a magnetic recording medium according to an embodiment of the present invention and FIG. 3B is a schematic view of a key portion.

Inside the apparatus, a polymer base film 11 to be a nonmagnetic supporting body fed from a feeding roll 10 is guided to an outer circumference of a cylindrical cooling can 12 and wound by a winding roll 13.

Here, an electron beam 15 emitted from an electron gun 14 is irradiated on a crucible 16 filled with Co, etc. to evaporate, then, adhered substances vapor 17 such as Co is shot obliquely to a surface of the base film 11 so that the adhered substances are deposited on the surface of the base film 11.

At this time, the upper limit (a maximum incident angle $\theta_{max}$) and the lower limit (a minimum incident angle $\theta_{min}$) of the incident angle of the adhered substance vapor 17 to the surface of the base film 11 are controlled by an opening position of a block plate 18 and, for example in a process of forming an under layer, the maximum incident angle of the adhered substance vapor 17 to be the under layer is preferably 70° or less with respect to the base film 11 for deposition.

Also, the adhered substances are deposited while spraying an oxygen gas on the moving nonmagnetic supporting body from an oxygen supplier 19 near the surface to be deposited.

When forming a film while spraying an oxygen gas, for example in a process of forming a film of the magnetic layer 3, magnetic grain of α-Co and nonmagnetic CoO exist together. Thus, by making crystal grain fine by introducing the nonmagnetic crystal grain, magnetic characteristics are improved and magnetic bonding between magnetic grain is interrupted whereby the medium noise can be reduced.

Here, by adjusting the amount of oxygen gas to be supplied, a content ratio of oxygen in the film to be deposited, for example the O/Co atomic ratio, can be controlled.

For example, at the time of forming the under layer 2, an oxygen gas is supplied by 0.8 to 1.5 litter/minute and the atomic ratio of O/Co is, for example, set to be about 0.6 to 1.0. While when forming the magnetic layer 3, an oxygen gas is supplied by 0.4 to 0.6 litter/minute and the atomic ratio of O/Co is, for example, set to be about 0.2 to 0.4.

The protective layer 4, the topcoat layer 5, and the back coat layer 6 may be formed by using a well known method.

A predetermined magnetic recording medium can be obtained by processing the thus obtained laminated body to be a predetermined shape and size. As the shape of the magnetic recording medium, any of the shapes normally used as magnetic recording media may be adopted, such as a tape shape, film shape, sheet shape, card shape, disk shape, and drum shape.

Thus, according to the method of producing the magnetic recording medium of the present embodiment, a magnetic recording medium produced by forming a magnetic layer by a deposition method capable of attaining high C/N ratio characteristics particularly in a short wavelength range and further high-density recording can be produced.

EXAMPLE

A sample of an obliquely evaporated tape of a configuration shown in FIG. 2 was produced by the following process.

Polyethylene naphthalate (PEN) was used for a polymer base film 11 to be a nonmagnetic supporting body 1.

In the oblique evaporation apparatus shown in FIG. 3, the base film 11 runs on a cooling can 12 after vacuum pumping a chamber. A part of the cooling can 12 was opened by a block plate 18, a crucible 16 containing a Co ingot was placed beneath the opening portion, and the Co was fused by an electron beam 15 to form a Co thin film on the base film 11.

By changing a positional relationship of the opening portion made by the block plate 18 and the crucible 16, an incident angle of the vapor deposition was changed.

Also, at the time of vapor deposition, oxygen was introduced from around the minimum incident angle and maximum incident angle of the opening portion to appropriately oxidize the Co.

Common conditions in forming a film of the under layer 2 and forming the magnetic layer 3 are shown below.

Film Forming Conditions
ultimate degree of vacuum: $2 \times 10^{-3}$ (Pa)
degree of vacuum at vapor deposition: $3 \times 10^{-2}$ (Pa)
ingot: Co100

Note that a thickness of each layer was controlled by a line speed at the time of vapor deposition.

First, the under layer 2 was formed. The film was formed by changing an incident angle within a range of 0 to 50° and a flow amount of oxygen introduction within a range of 0.5 to 2.0 liter/minute.

Furthermore, the magnetic layer 3 comprised of Co/CoO was formed on the under layer 2.

The vapor deposition incident angle was 45 to 90° and the a flow amount of oxygen introduction was 0.5 litter/minute.

Furthermore, a protective film 4 comprised of carbon C was formed on the magnetic layer 3, a back coat layer 6 was formed on the back surface of the nonmagnetic supporting body 1, a topcoat layer 6 was formed by coating a lubricant on the protective film 4, then the result was cut to complete as a tape.

Here, a film thickness of the under layer 2 was made to be 5 to 100 nm, the magnetic layer 3 to be 30 to 200 nm and the protective film 4 to be constant at 10 nm.

[Test on Dependency on Under Layer Thickness]

Next, changes of magnetic characteristics of the sample at the time of changing a film thickness of the under layer 2 in a range of 10 to 100 nm were examined under conditions that a film thickness of the magnetic layer was constant at 100 nm, the atomic ratio of O/Co of the under layer was constant at 0.9 and the maximum incident angle at forming the under layer was constant at 50°.

Figure 4:
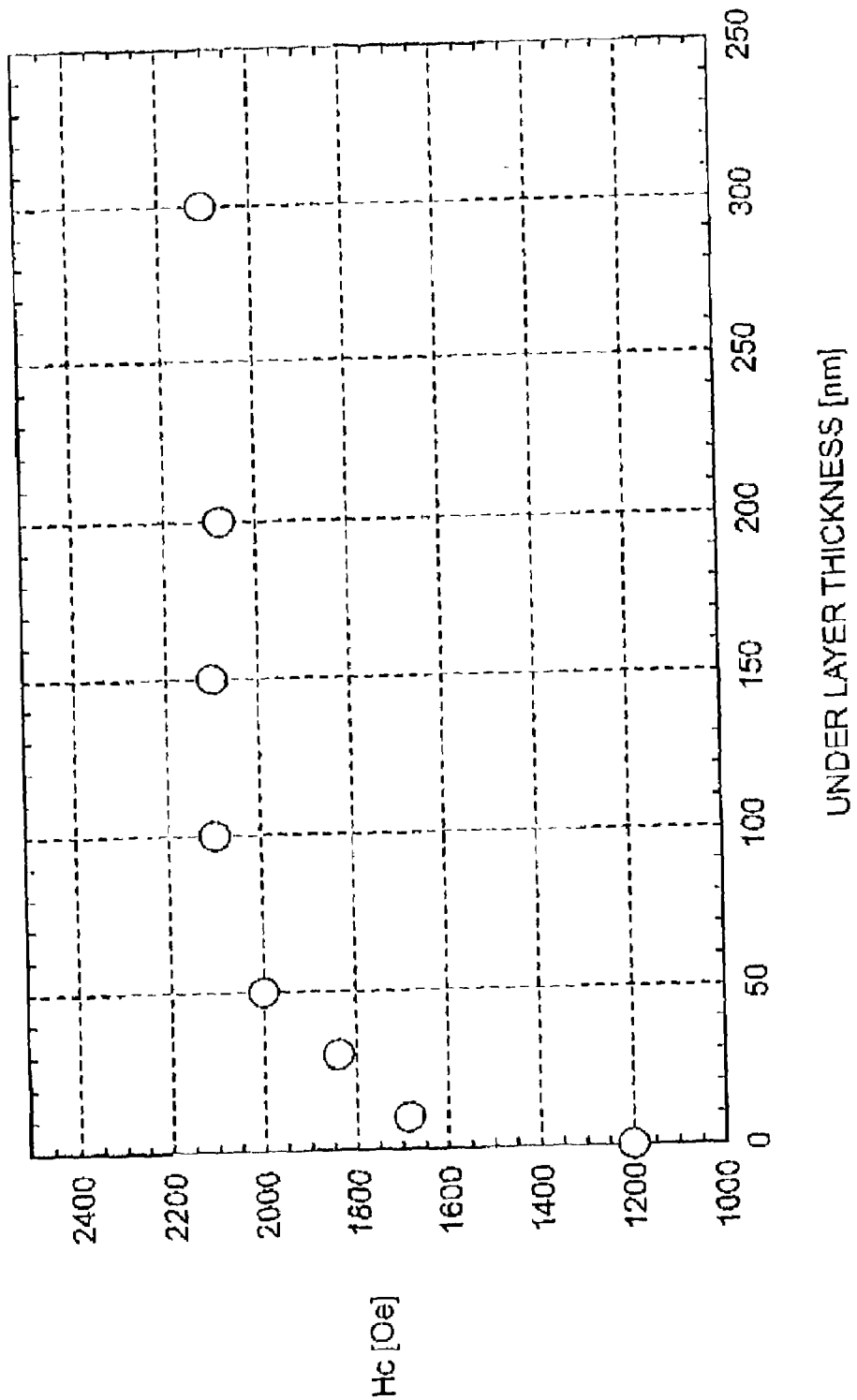
FIG. 4 is a view of a coercive force of a sample plotted with respect to a film thickness of an under layer in an example.

FIG. 4 is a view wherein a coercive force Hc of the sample is plotted with respect to the film thickness of the under layer 2.

It is understood from FIG. 4 that the Hc largely rises due to the under layer having a thickness of only 10 nm compared with the case without an under layer.

When the thickness of the under layer is made further thicker, the Hc of the medium increases up to around the thickness of 50 nm, while when the thickness of the under layer is thicker than that, the Hc does not change much.

Next, samples in which the magnetic layer 3 had a constant film thickness of 100 nm, the under layer 2 had a constant atomic ratio of O/Co of 0.9 and a constant maximum incident angle of 50° at forming the under layer, and a film thickness of the under layer 2 was changed from 5 nm (sample 1), 10 nm (sample 2), 25 nm (sample 3), 50 nm (sample 4), 75 nm (sample 5) and 100 nm (sample 6) and a sample not having the under layer 2 (comparative sample 1) were prepared and a relationship of the atomic of O/Co, medium noise, and C/N ratio was measured.

A recording wavelength of a signal to be recorded was set to about 0.3 μm, noise was made to be an average of values when a signal frequency was ±1 MHz and the comparative sample 1 was made to be 0 dB.

The results are shown in Table 1.

TABLE 1

|  | Under layer thickness [nm] | Medium noise [dB] | C/N ratio [dB] |
|---|---|---|---|
| Sample 1 | 5 | −1.6 | +2.3 |
| Sample 2 | 10 | −2.3 | +3.2 |
| Sample 3 | 25 | −2.2 | +3.0 |
| Sample 4 | 50 | −2.0 | +3.0 |
| Sample 5 | 75 | −1.9 | +2.7 |
| Sample 6 | 100 | −1.8 | +2.8 |
| Comparative Sample 1 | No under layer | 0 | 0 |

From Table 1, the C/N ratio increases up to the under layer film thickness of 50 nm in the same way as Hc, but the rising pitch is not very much large. In a range where the under layer thickness is 50 nm or more, the Hc starts to peak and the C/N ratio also starts to peak.

In terms of a volume recording density, the thinner a thickness of a medium, the better.

A large improvement of the C/N ratio is attained with an under layer of 10 nm while improvements of Hc and C/N ratio are not observed in a range of 50 nm or more, so the thickness of the under layer is preferably 50 nm or less.

[Test of Dependency on Maximum Incident Angle at Forming Under Layer]

Next, samples in which the magnetic layer 3 had a constant film thickness of 100 nm, the under layer 2 had a constant film thickness of 30 nm and a constant atomic ratio of O/Co of 0.9 and a constant minimum incident angle of 30° at forming the under layer, and the maximum incident angle at forming the under layer 2 was changed to 40° (sample 7), 50° (sample 8), 60° (sample 9), 70° (sample 10), 80° (sample 11), and 90° (sample 12) and a sample having no under layer 2 (comparative sample 2) were prepared and a relationship of the maximum incident angle, medium noise, and C/N ratio was measured.

A recording wavelength of a signal to be recorded was set to about 0.3 μm, noise was made to be an average of values when a signal frequency was ±2 MHz and the comparative sample 2 was made to be 0 dB.

A recording head was a MIG head having a gap length of 0.2 μm and a reproduction head was a multilayer type head having a gap length of 0.18 μm.

TABLE 2

|  | Maximum incident angle at forming under layer | Medium noise [dB] | C/N ratio [dB] |
|---|---|---|---|
| Sample 7 | 40° | −2.0 | +2.5 |
| Sample 8 | 50° | −2.1 | +3.2 |
| Sample 9 | 60° | −2.3 | +2.7 |
| Sample 10 | 70° | −2.0 | +2.8 |
| Sample 11 | 80° | −1.0 | +1.9 |
| Sample 12 | 90° | −0.7 | +1.5 |
| Comparative sample 2 | No under layer | 0 | 0 |

From Table 2, there was a tendency that the medium noise decreases when the maximum incident angle at forming the under layer was 70° or less.

A cause of decreasing the medium noise is assumed as below.

Namely, it is assumed that by lowering the maximum incident angle at forming the under layer, the shadowing effect of vapor deposition crystal grain is decreased and an under layer having a smooth surface and a uniformed configuration is formed. Consequently, the surface nature of the magnetic layer formed thereon is improved and, moreover, the film becomes to have a uniformed configuration even from an initial stage of its film growth.

Also, since the medium Hc is improved as the medium noise is reduced, an output in the short wavelength range is improved and high C/N ratio can be obtained.

[Test of Dependency on O/Co Atomic Ratio of Under Layer]

Next, a relationship of O/Co atomic ratio of the under layer 2, magnetic characteristics, and electromagnetic conversion characteristic was examined.

The Hc was measured for the magnetic characteristics. The Hc widely increased when the O/Co atomic ratio was 0.4 or more. It is conceivable that this composition is a composition by which the under layer is demagnetized.

Next, samples in which the magnetic layer 3 had a constant film thickness of 100 nm, the under layer 2 had a constant film thickness of 30 nm, the maximum incident angle was constant at 50° at forming the under layer 2, and the O/Co atomic ratio in the under layer 2 was changed by changing an oxygen introduction amount at forming the under layer 2 to obtain the atomic ratio of 0.4 (sample 13), 0.6 (sample 14), 1.0 (sample 15), 1.2 (sample 16), 0.2 (comparative sample 4) and 0.3 (comparative sample 5) and a sample having no under layer 2 (comparative sample 3) were prepared and a relationship of the O/Co atomic ratio, medium noise, and C/N ratio was measured.

A recording wavelength of a signal to be recorded was set to about 0.3 μm and noise was made to be an average of values when a signal frequency was ±2 MHz.

The results are shown in Table 3.

TABLE 3

|  | O/Co Atomic Ratio of under Layer [%] | Medium Noise [dB] | C/N Ratio {dB} |
|---|---|---|---|
| Sample 13 | 0.4 | −1.3 | +2.5 |
| Sample 14 | 0.6 | −2.0 | +3.2 |
| Sample 15 | 1.0 | −2.1 | +3.4 |
| Sample 16 | 1.2 | −1.9 | +3.0 |
| Comparative sample 3 | No under layer | 0 | 0 |
| Comparative sample 4 | 0.2 | +0.8 | −0.4 |
| Comparative sample 5 | 0.3 | −0.2 | +0.2 |

It was learned that when the O/Co atomic ratio became less than 0.4 and the under layer 2 remained magnetized, the medium noise was liable to increase.

When the medium noise is not increased, it is considered that the ratio of O and Co becomes O/Co=0.4 and there was almost no magnetization of the under layer remained, i.e., the under layer was substantially nonmagnetic.

Also, the C/N ratio is largely increased when the O/Co atomic ratio is 0.4 or more.

As the medium noise decreases, the under layer becomes demagnetized in this composition range, so an output becomes improved in a short wavelength range due to an improvement of the Hc of the magnetic layer.

Due to the above results, the O/Co ratio of the under layer is made to be 0.4 or more in the present invention.

The present invention was explained by the above embodiment and examples as above, but the present invention is not limited to those.

For example, a film thickness of the under layer is not limited to 50 nm or less but may be made thicker than 50 nm. Also, the maximum incident angle at forming the under layer is not limited to 70° or less but an incident angle of larger than 70° is also possible.

Other than the above, a variety of modifications can be made within the scope of the present invention.

According to the magnetic recording medium of the present invention, high C/N ratio characteristics is attained particularly in a short wavelength range and a further higher-density recording is possible in a magnetic recording medium produced by forming a magnetic layer by a vapor deposition method.

According to the production method of a magnetic recording medium of the present invention, it is possible to produce a magnetic recording medium capable of attaining high C/N ratio characteristics particularly in a short wavelength range and a further higher-density recording in a magnetic recording medium produced by forming a magnetic layer by a vapor deposition method.

What is claimed is:

1. A magnetic recording medium comprising:
    a nonmagnetic supporting body comprising a polymer substrate;
    a substantially nonmagnetic under layer formed on said nonmagnetic supporting body, containing Co and O and having an atomic ratio of O/Co of more than 0.6; and
    a magnetic layer formed on said under layer and containing Co and O;
    wherein said magnetic layer is formed by a vapor deposition method.

2. A magnetic recording medium as set forth in claim 1, wherein said under layer is a film deposited by a maximum incident angle of an under layer component of 70° or less with respect to said nonmagnetic supporting body in the vapor deposition method.

3. A magnetic recording medium comprising:
a nonmagnetic supporting body comprising a polymer substrate;
an under layer formed on said nonmagnetic supporting body, containing Co and O and having an atomic ratio of O/Co of more than 0.6: and
a magnetic layer formed on said under layer and containing Co and O;
wherein said magnetic layer is formed by a vapor deposition method; and
wherein said under layer has a film thickness of 50 nm or less.

4. A magnetic recording medium as set forth in claim 3, wherein said under layer has a film thickness of between 10 nm and 50 nm.

5. A magnetic recording medium as set forth in claim 1, wherein said under layer has an atomic ratio of O/Co of more than 0.6 but less than 1.0.

6. A magnetic recording medium as set forth in claim 2, wherein said under layer is a film deposited by a maximum incident angle of an under layer component of between 70° and 40° with respect to said nonmagnetic supporting body in the vapor deposition method.

7. A magnetic recording medium as set forth in claim 6, wherein said under layer is a film deposited by a maximum incident angle of an under layer component of between 60° and 50° with respect to said nonmagnetic supporting body in the vapor deposition method.

8. A magnetic recording medium comprising:
a nonmagnetic supporting body comprising a polymer substrate;
an under layer formed on said nonmagnetic supporting body, wherein said under layer is a substantially nonmagnetic and contains Co and O with an atomic ratio of O/Co of more than 0.6 but less than 1.0, said under layer is a film deposited in the vapor deposition method by a maximum incident angle of an under layer component of between 70° and 40° with respect to said nonmagnetic supporting body, and the film thickness of the under layer is between 10 nm and 50 nm; and
a magnetic layer formed on said under layer and containing Co and O;
wherein said magnetic layer is formed by a vapor deposition method.

9. A magnetic recording medium as set forth in claim 3, wherein said under layer is a film deposited by a maximum incident angle of an under layer component of 70° or less with respect to said nonmagnetic supporting body in the vapor deposition method.

10. A magnetic recording medium as set forth in claim 3, wherein said under layer has an atomic ratio of O/Co of more than 0.6 but less than 1.0.

11. A magnetic recording medium as set forth in claim 9, wherein said under layer is a film deposited by a maximum incident angle of an under layer component of between 70° and 40° with respect to said nonmagnetic supporting body in the vapor deposition method.

12. A magnetic recording medium as set forth in claim 11, wherein said under layer is a film deposited by a maximum incident angle of an under layer component of between 60° and 50° with respect to said nonmagnetic supporting body in the vapor deposition method.

13. A magnetic recording medium as set forth in claim 3 wherein said under layer is substantially nonmagnetic.

* * * * *